US008155248B2

(12) United States Patent
Stirling-Gallacher

(10) Patent No.: US 8,155,248 B2
(45) Date of Patent: Apr. 10, 2012

(54) EQUALIZING STRUCTURE AND EQUALIZING METHOD

(75) Inventor: Richard Stirling-Gallacher, Esslingen (DE)

(73) Assignee: Sony Deutschland GmbH, Berlin (DE)

( * ) Notice: Subject to any disclaimer, the term of this patent is extended or adjusted under 35 U.S.C. 154(b) by 613 days.

(21) Appl. No.: 12/375,844

(22) PCT Filed: Jul. 3, 2007

(86) PCT No.: PCT/EP2007/005888
§ 371 (c)(1),
(2), (4) Date: Jan. 30, 2009

(87) PCT Pub. No.: WO2008/025397
PCT Pub. Date: Mar. 6, 2008

(65) Prior Publication Data
US 2009/0323795 A1 Dec. 31, 2009

(30) Foreign Application Priority Data

Aug. 28, 2006 (EP) .................................. 06017929

(51) Int. Cl.
*H04L 27/06* (2006.01)
(52) U.S. Cl. ...................................................... 375/341
(58) Field of Classification Search .................. 375/232, 375/316, 340, 341, 347
See application file for complete search history.

(56) References Cited

U.S. PATENT DOCUMENTS

| | | |
|---|---|---|
| 2002/0097784 A1 | 7/2002 | Brunel |
| 2005/0018789 A1 | 1/2005 | Jia et al. |

FOREIGN PATENT DOCUMENTS

| | | |
|---|---|---|
| WO | WO 96/26578 | 8/1996 |
| WO | WO 98/12848 | 3/1998 |

OTHER PUBLICATIONS

Zhongding Lei, et al., "Near Optimal List MIMO Detection", IEEE PIMRC 2005 Conference, Sep. 11-14, 2005, 6 pages.

(Continued)

*Primary Examiner* — David C. Payne
*Assistant Examiner* — Leon-Viet Nguyen
(74) *Attorney, Agent, or Firm* — Oblon, Spivak, McClelland, Maier & Neustadt, L.L.P.

(57) ABSTRACT

An equalizing structure and method for a wireless communication system receiving device, in which two or more transmit signals transmitted in parallel from one or more transmitters are received in received signal vectors representing two or more received data streams, the signals including information modulated onto carrier signals according to a modulation scheme, all possible transmit signals being represented by candidate constellation values in the signal constellation of the modulation scheme. A processor calculates an estimate for a constellation value of a received signal and determines a number of candidate constellation values in the vicinity of the estimated constellation value in the signal constellation. A metric value calculator calculates metric values based on the received signal vectors and the product of channel estimation values with candidate signal vectors, each candidate signal vector including a candidate constellation value for each of the two or more transmit signals, wherein the metric values are calculated for each constellation value of the number of candidate constellation values and the estimated constellation value. A maximum likelihood detector detects one of the candidate signal vectors having a minimum Euclidean distance to a respective receive signal vector as a most likely transmit signal vector based on the metric values.

11 Claims, 6 Drawing Sheets

OTHER PUBLICATIONS

Figure 1:
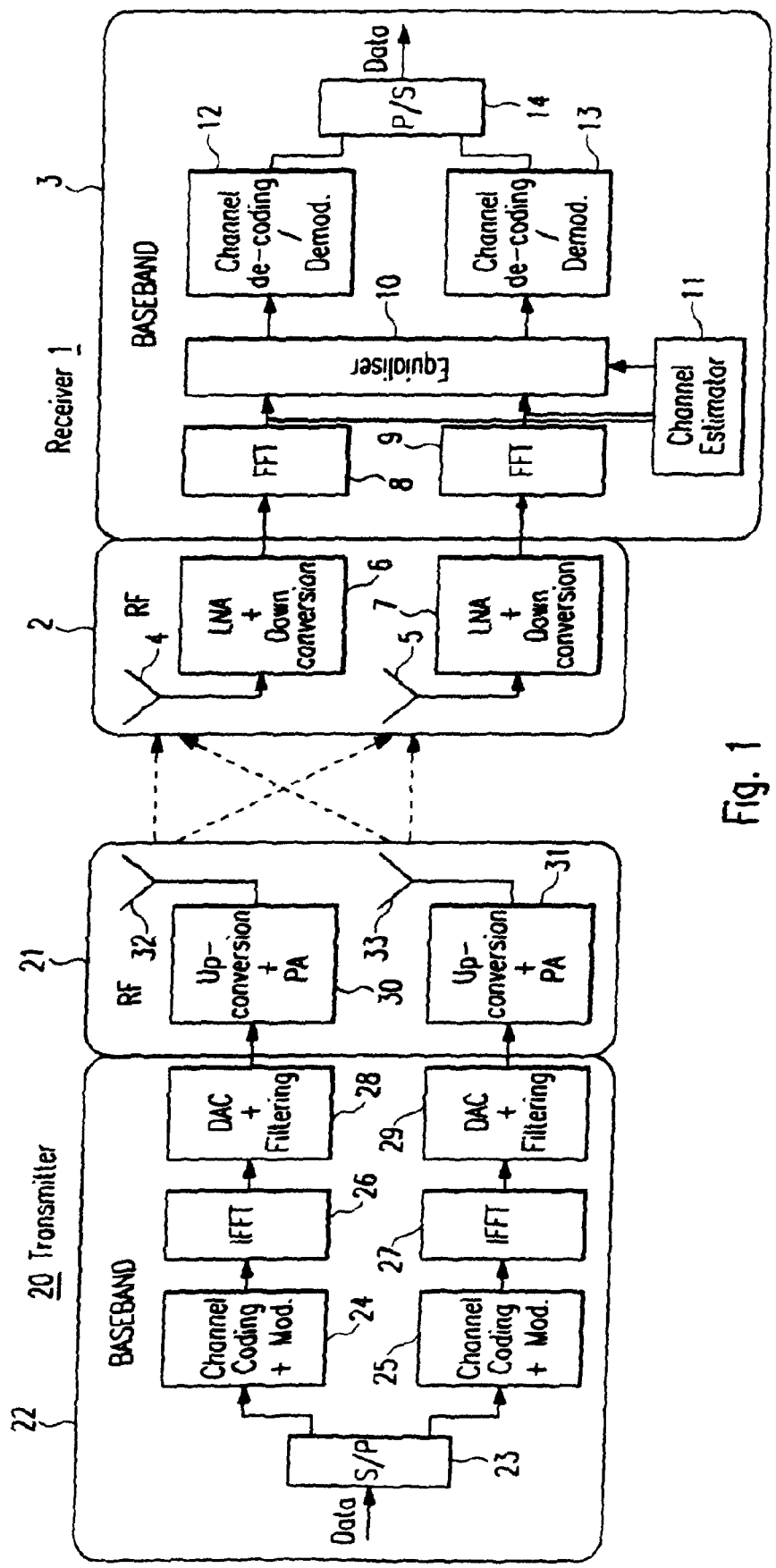

Xiaodong Li, et al., "Reduced-Complexity Detection Algorithms for Systems Using Multi-Element Arrays", Global Telecommunications Conference (Globecom 2000), Nov. 27-Dec. 1, pp. 1072-1076.

Geert Awater, et al., "Reduced Complexity Space Division Multiplexing Receivers", IEEE Vehicular Technology Conference (Spring VTC 2000), vol. 1, May 15-18, 2000, pp. 11-15.

Jungiang Li, et al., "Multi-Stage Low Complexity Maximum Likelihood Detection for OFDM/SDMA Wireless LANs", IEEE International Conference on Communications (ICC#2001), vol. 4, Feb. 11-14, 2001, pp. 1152-1156.

Jacky Ho-Yin Fan, et al., "Near Maximum Likelihood Detection Schemes for Wireless MIMO Systems", IEEE Transactions on Wireless Communications, vol. 3, No. 5, Sep. 2004, pp. 1427-1430.

Xuan Nam Tran, et al., "Performance Comparison of MMSE-SIC and MMSE-ML Multiuser Detectors in a STBC-OFDM System", IEEE PIMRC 2005 Conference, Sep. 11-14, 2005, 5 pages.

Zhigang Zhou, et al., "Approximation Maximum Likelihood Detector for V-BLAST Systems", IEEE VTC Conference Spring 2004, May 17-19, 2004, 4 pages.

Bo Gui, et al., "Performance Evaluation of V-BLAST Detection Algorithms and a Novel Segmented Detection Algorithm", IEEE VTC Conference Spring 2004, May 17-19, 2004, pp. 674-678.

Jacky Ho-Yin Fan, et al., "A Sub-Optimum MLD Detection Scheme for Wireless MIMO Systems", IEEE International Symposium on Advances in Wireless Communication (ISWC), 2002, 2 pages.

Office Action issued Jun. 10, 2011, in European Patent Application No. 06 017 929.8.

Christoph Windpassinger, et al., "From Lattice-Reduction-Aided Detection Towards Maximum-Likelihood Detection in MIMO Systems", Internet Citation, XP-002433912, Jul. 2003, 5 pages.

M. Magarini, et al. "Suboptimal Detection Scheme for MIMO Systems With Non-Binary Constellations", IEEE, vol. 3, pp. 1579-1582, XP010754207, 2004.

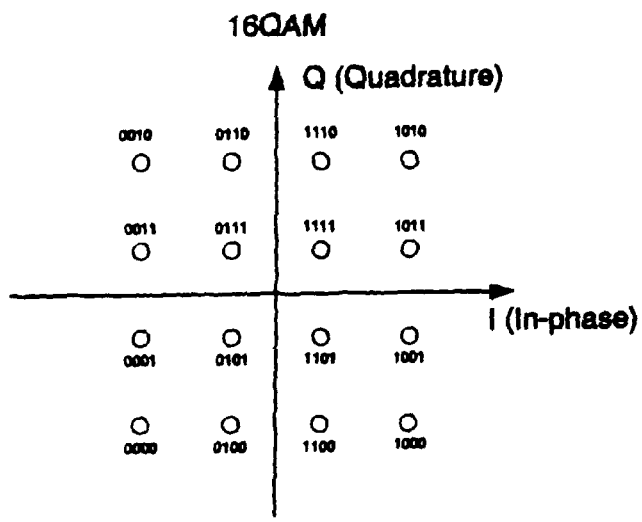
Figure 4 - Example 16 QAM Constellation with bit mappings ($b_1$, $b_2$, $b_3$ and $b_4$)
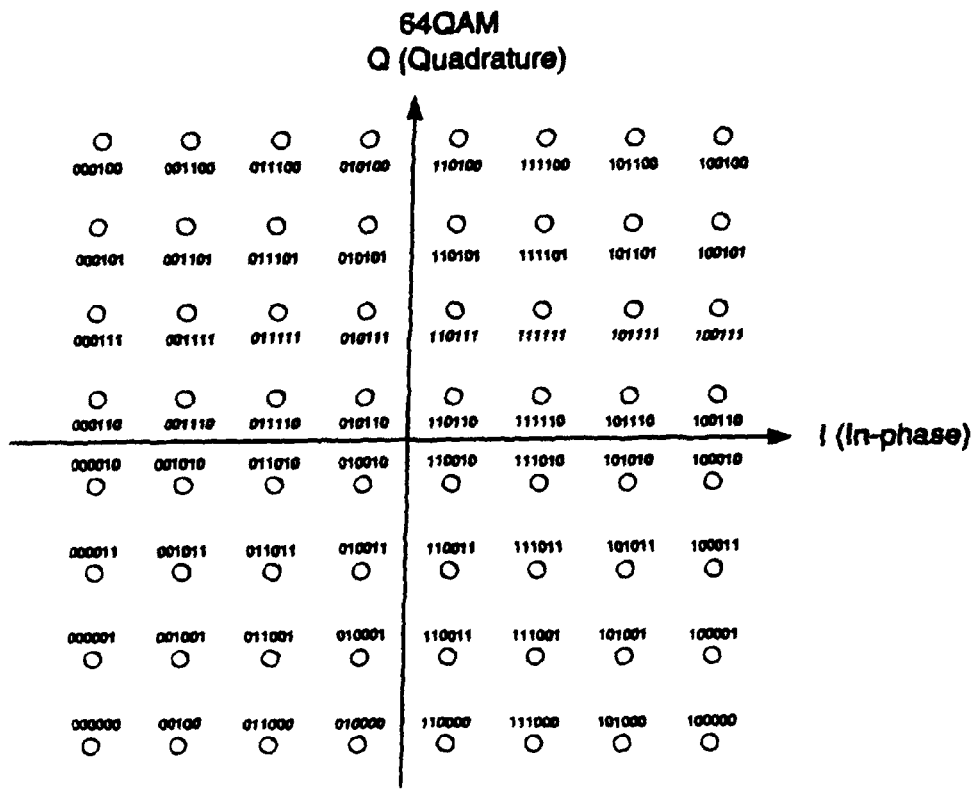
Figure 5 - Example 64 QAM Constellation with bit mappings ($b_1$, $b_2$, $b_3$, $b_4$, $b_5$, $b_6$)

| Metric | Bit Pattern (Tx1, Tx2) associated with $s_{2,j}$ and $s_{1,j}$ | |
|---|---|---|
| $m_2 = 17$ | 1001 1111 | Row 16 |
| ⋮ | ⋮ | |
| $m_6 = 2.2$ | 10⓵ 1110 | Row 3 |
| $m_1 = 0.4$ | 1001 ⑴1⓪ | Row 2 |
| $m_3 = 0.03$ | 10⓪1 111⓪ | Row 1 |
Sign change ⇒ weight for this bit = $m_6 - m_3$ = 2.17
Sign change, ⇒ weight for this bit = $m_1 - m_3$ = 0.37
Figure 6 — Example of sorted metric table used for soft output (16 QAM).
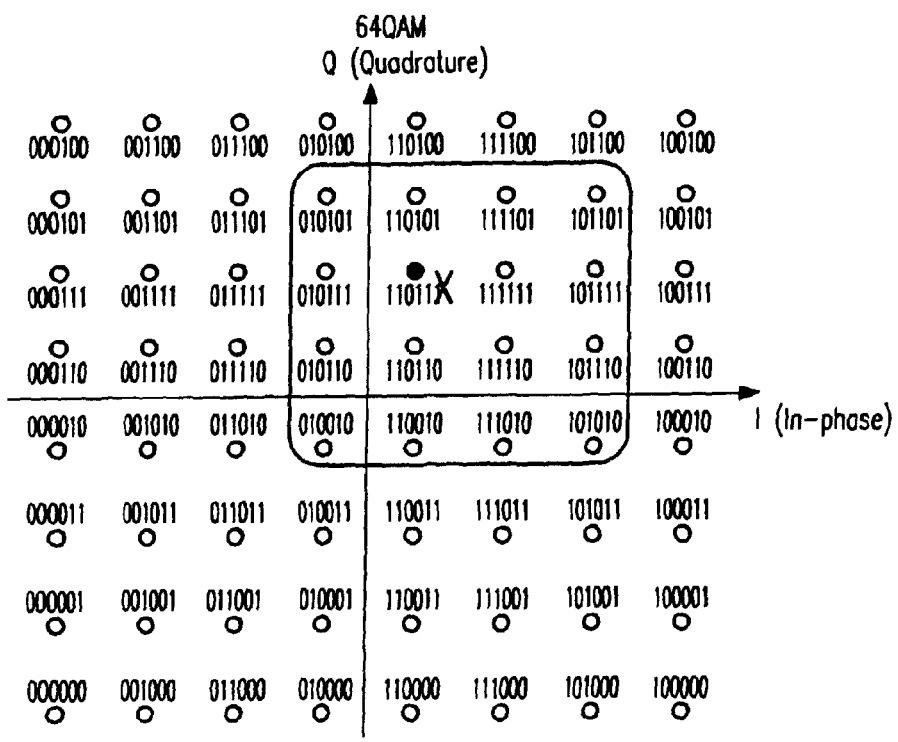
Fig. 7 — Example zone (16 points) around MMSE point – bit mappings $(b_1, b_2, b_3, b_4, b_5, b_6)$

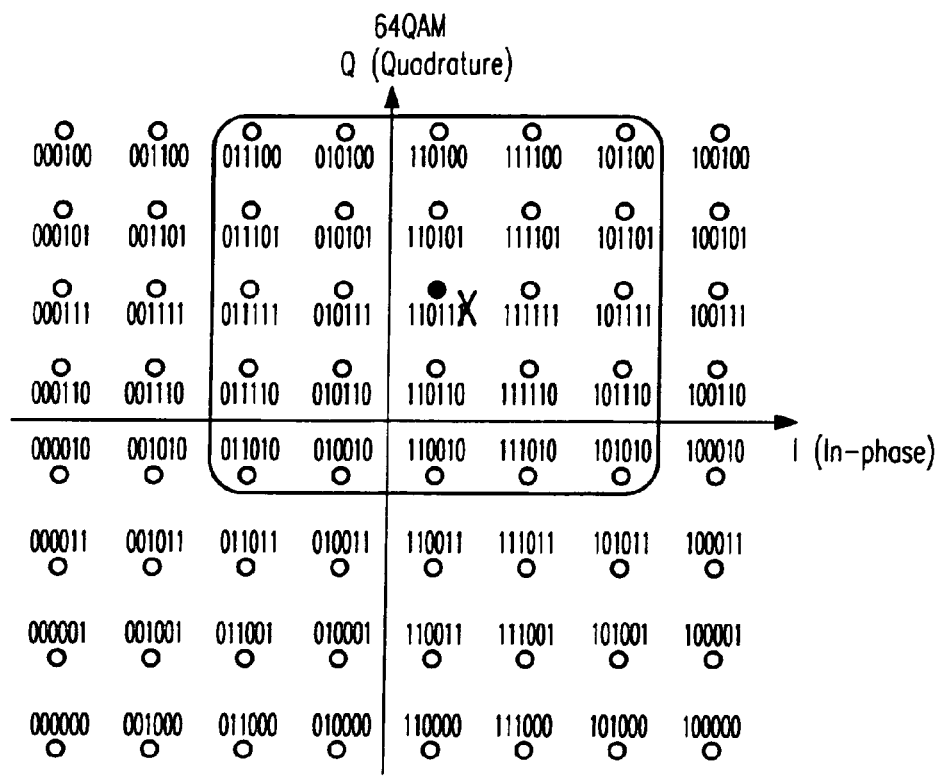
Fig. 8 —Example zone (25 points) around MMSE point- bit mappings $(b_1,b_2,b_3,b_4,b_5,b_6)$
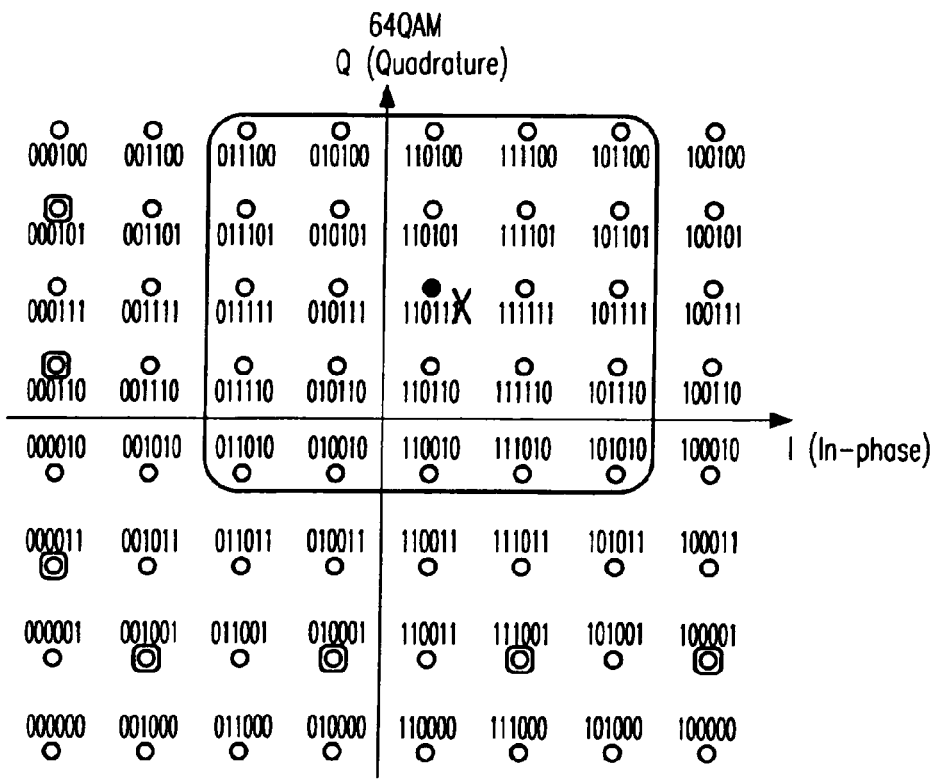
Fig. 9 —Example zone (32 points) around MMSE point- bit mappings $(b_1,b_2,b_3,b_4,b_5,b_6)$

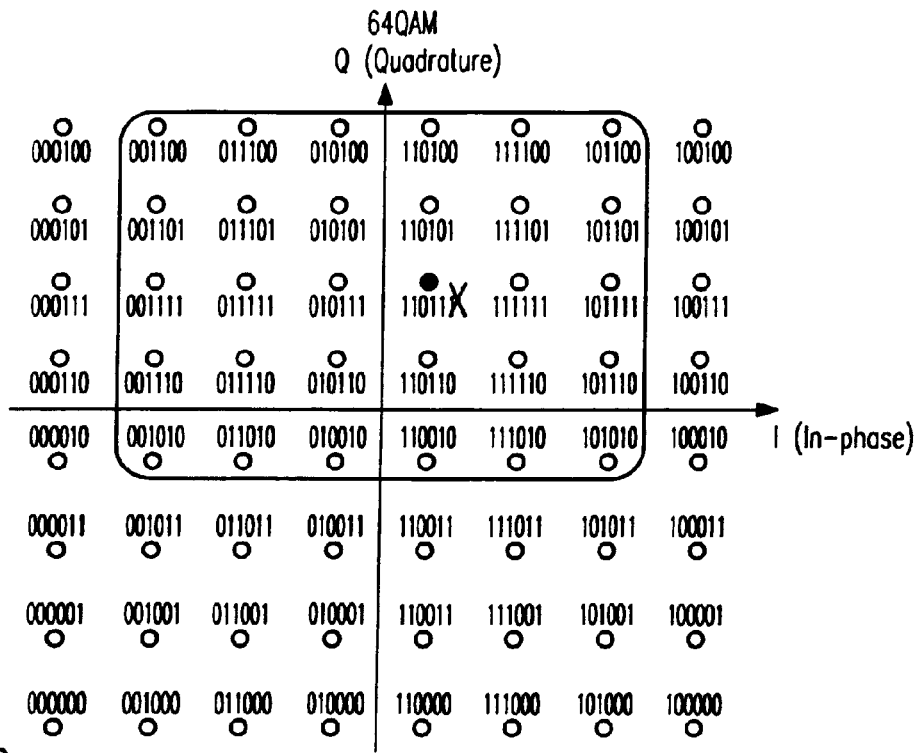
Fig. 10 - Example zone (36 points) around MMSE point- bit mappings ($b_1, b_2, b_3, b_4, b_5, b_6$)
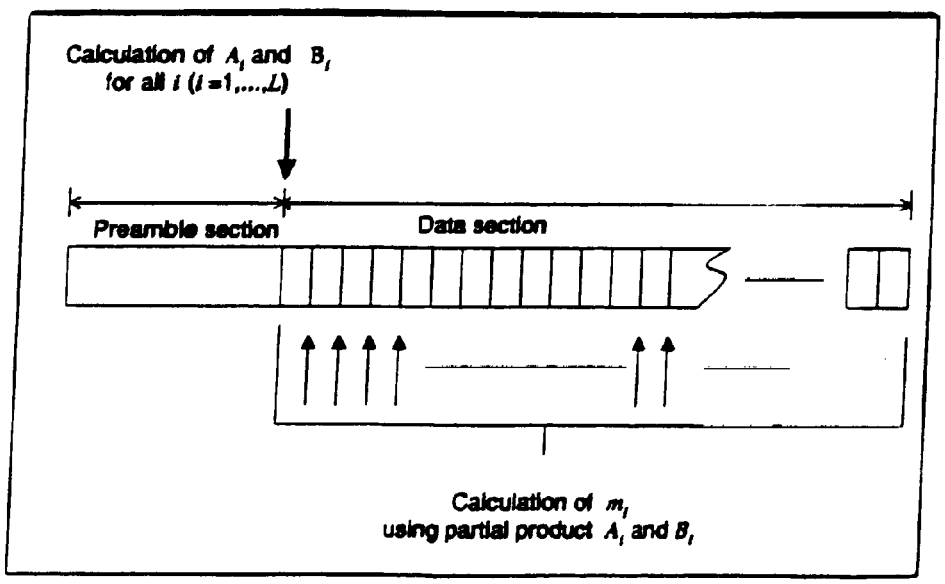
Figure 11 - Partial Hs pre-calculation.

EQUALIZING STRUCTURE AND EQUALIZING METHOD

The present invention relates to an equalizing structure for a receiving device for a wireless communication system and an equalizing method of a wireless communication system, in which two or more transmit signals are transmitted in parallel from one or more transmitters and are received in receive signal vectors representing two or more receive data streams, said signals comprising information modulated onto carrier signals according to a modulation scheme, wherein all possible transmit signals are represented by candidate constellation values in the signal constellation of said modulation scheme.

The present invention particularly relates to an equalizing structure and method which can be used in or for receivers of wireless communication systems which are subjected to multi-user or multi-channel interference. Such interference is experienced e.g. in communication systems in which different users and/or different channels occupy the same frequency and time slot allocations. Although such interference is generally not desirable in communication systems, it is in some systems used to increase the data rate, the spectral efficiency and/or the system throughput or data rate. Examples of such systems are among others the so-called multiple-input, multiple-output (MIMO) systems, code division multiple access (CDMA) systems, orthogonal frequency division multiplexing code division multiple access (OFDM-CDMA) systems and so forth.

MIMO systems typically consist of two or more parallel channels which occupy the same frequency and time slot in order to increase the data rate and transmission range. OFDM-CDMA systems have e.g. been proposed for the fourth generation telecommunication systems. In this case, OFDM is used with frequency domain spreading and different users or channels use different codes.

In such systems, some equalizing structures and equalizing methods used in the receivers use a maximum likelihood detection (MLD) in order to identify and distinguish the data symbols transmitted in the parallel, e.g. in the same time slot and the same frequency band, by two or more users and/or in two or more communication channels. An example of a maximum likelihood detection with reduced complexity is e.g. disclosed in "Near Optimal List MIMO Detection" by Z. Ley, Y. Dai, S. Sun, IEEE PIMRC 2005 Conference, Berlin, Germany, Sep. 11-14, 2005.

The object of the present invention is to provide an equalizing structure for a receiving device of a wireless communication system and an equalizing method for a wireless communication system with a reduced complexity. The above object is achieved by an equalizing structure for a receiving device of a wireless communication system, in which two or more transmit signals transmitted in parallel from one or more transmitters are received in receive signal vectors representing two or more receive data streams, said signals comprising information modulated onto carrier signals according to a modulation scheme, wherein all possible transmit signals are represented by candidate constellation values in the signal constellation of said modulation scheme according to claim 1. The equalizing structure of the present invention comprises a processor adapted to calculate an estimate for a constellation value of a received signal and to determine a number of candidate constellation values in the vicinity of said estimated constellation value in said signal constellation, a metric value calculator adapted to calculate metric values on the basis of said receive signal vectors and the product of channel estimation values with candidate signal vectors, each candidate signal vector comprising a candidate constellation value for each of said two or more transmit signals, wherein said metric values are calculated for each constellation value of said number of constellation values and said estimated constellation value, and a maximum likelihood detector adapted to detect one of said candidate signal vectors having a minimum Euclidian distance to a respective receive signal vector as a most likely transmit signal vector on the basis of said metric values.

The above object is also achieved by an equalizing method according to claim 10. The above object is further achieved by a computer program directly loadable into an internal memory of a receiving device for receiving information signals in a wireless communication system according to claim 19, comprising software code adapted to perform the steps of one of the method claims of the present invention when run in said receiving device.

The equalizing structure and the equalizing method of the present invention allows a reduction of the complexity of the processing while still maintaining a high performance. Advantageously, in the equalizing structure of the present invention, the processor is adapted to calculate said estimate for said constellation value on the basis of channel estimation values and said received signal. Hereby, the processor is advantageously adapted to calculate said estimate for said constellation value on the basis of a product of a matrix of said channel estimation values with said received signal vector. Hereby, the processor is advantageously adapted to calculate said estimate for said constellation value on the basis of a product of a pseudo inverse matrix of said channel estimation values with said received signal vector.

Advantageously, the processor is adapted to calculate said estimate for said constellation value on the basis of channel estimation values, a signal-to-noise value estimate and said received signal. Hereby, the processor is advantageously adapted to calculate said estimate for said constellation value on the basis of a product of a matrix comprising said channel estimation values and inverse values of said signal-to-noise value estimate with said received signal. Hereby, the processor is advantageously adapted to calculate said estimate for said constellation value on the basis of a product of pseudo inverse matrix comprising said channel estimation values and inverse values of said signal-to-noise value estimate with said received signal.

Further advantageously, the processor, after calculating said estimate for each constellation value of a received signal vector, is advantageously adapted to choose one of said constellation value estimates depending on the transmission quality and to determine a number of candidate constellation values in the vicinity of said chosen estimated constellation value in said signal constellation.

Further advantageously, the processor is adapted to determine a number of candidate constellation values in the vicinity of said estimated constellation values in said signal constellation by selecting said number of candidate constellation values as a subset of all available constellation values in said signal constellation around said one estimated constellation value.

Advantageously features are defined in the respective further dependent claims.

Figure 2:
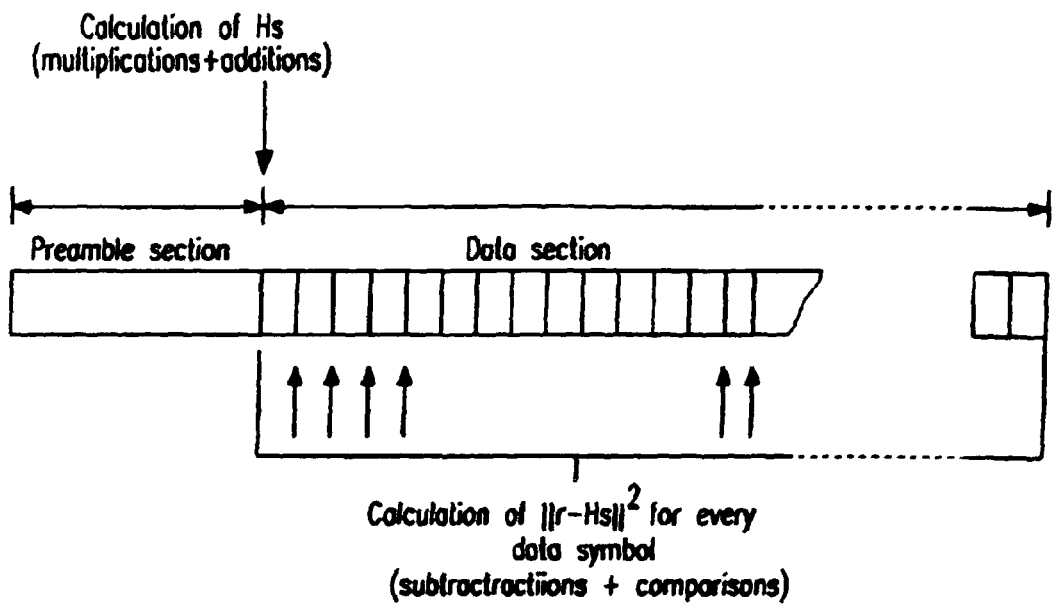
Figure 3:
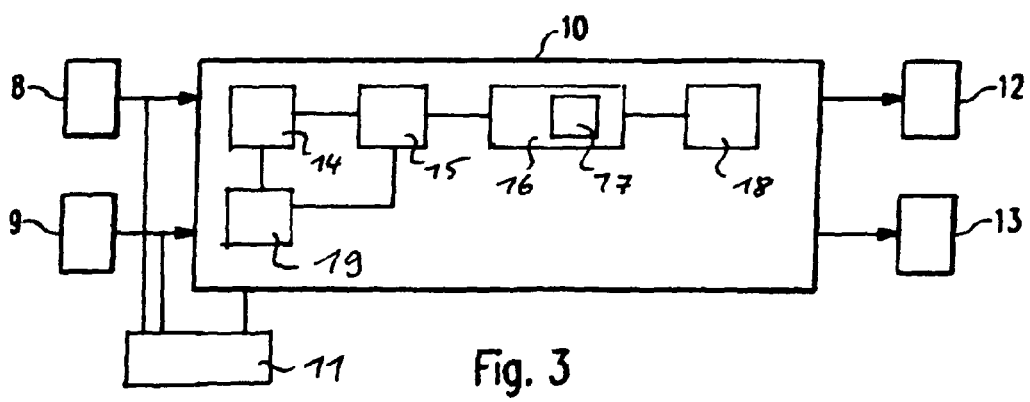

The present invention is explained in more detail in the following description of preferred embodiments in relation to the enclosed drawings, in which FIG. 1 shows a schematic block diagram of an example of an MIMO communication system in which an equalizing structure and an equalizing method according to the present invention are implemented, FIG. 2 schematically explains the processing steps for a maximum likelihood detection, FIG. 3 schematically shows a block diagram of an equalizing structure according to the present invention, FIG. 4 schematically shows an example of a 16 QAM constellation scheme with bitmappings, FIG. 5 schematically shows an example of a 64 QAM constellation scheme with bitmappings, FIG. 6 schematically shows an example of the sorted metric table used for a soft decision value output for the example of 16 QAM according to the present invention, FIG. 7 shows an example of a 16 QAM constellation scheme with an example of a subset of 16 constellation points around an estimated constellation value, FIG. 8 shows an example of a 64 QAM constellation scheme with an example of a subset of 25 constellation points around an estimated constellation point, FIG. 9 shows an example of a 64 QAM constellation scheme with an example for a subset of 32 constellation points around an estimated constellation point, FIG. 10 shows an example of a 64 QAM constellation scheme with an example for a subset of 36 constellation points around an estimated constellation value, and FIG. 11 shows a schematic example of a processing of a partial Hs precalculation according to the present invention.

As explained above, the present invention relates to an equalizing structure for a receiving device of a wireless communication system as well as an equalizing method for a wireless communication system. The wireless communication system can be any kind of wireless communication system in which information is modulated to carrier signals according to the currently known or future modulation scheme, wherein all possible transmit signals are represented by candidate constellation values in the same constellation of the modulation scheme. Hereby, every constellation point of the modulation scheme (also called signal constellation scheme) has an allocated bitmap value or constellation value, which is a digital value representing either a real or complex value.

The wireless communication system can be any kind of wireless communication system in which one or more transmitting devices communication with one or more receiving devices. The transmitting and receiving devices can e.g. be mobile devices or equipments, stationary devices or equipments of any available kind and functionality.

The present invention hereby specifically relates to a wireless communication system in which two or more transmit signals transmitted in parallel from one or more transmitters are received in receive signal vectors representing two or more receive data streams in the receiving device comprising an equalizing structure according to the present invention. The two or more transmit signals transmitted in parallel are hereby e.g. transmitted in the same time slot and frequency band. E.g., one transmitter may transmit the two or more transmit signals in parallel from two or more respective transmit antennas or two or more transmitters each having an antenna may transmit a respective transmit signal in parallel to each other. On the receiving side, two or more receive data streams, e.g. in one receiver having one, two or more receive antennas, are received in so-called receive signal vectors, wherein a receive signal vector represents the two or more receive data streams. The equalizing structure and the equalizing method of the present invention hereby serve to separate and estimate the two or more actually transmitted signals from the receive signal vectors.

As stated above, the present invention is not restricted to a specific wireless communication system. However, in the following the present invention is explained in relation to a MIMO system as a non-limiting example, a schematic diagram of which is shown in FIG. 1.

Generally, a MIMO system has $n_T$ transmitting antennas (each transmitting a different data symbol) and $n_R$ receiving antennas. Such a system has a maximum achievable data rate, which is $n_T$ time greater than an equivalent non-MIMO system. For example, in a MIMO system which has e.g. two transmitting antennas ($n_T$=2) and e.g. two receiver antennas ($n_R$=2), the maximum achievable data rate is two times higher than in a non-MIMO system. FIG. 1 shows the schematic block diagram of such a MIMO system for transmitting two independent symbols transmit signals in parallel.

The example MIMO system shown in FIG. 1 comprises a receiver 1 and a transmitter 20 for wireless communication on the basis of orthogonal frequency division multiplexing (OFDM). The receiver 1 comprises a radio frequency (RF) part 2 and a base band part 3. The radio frequency part 2 has two antennas 4 and 5, each being connected to a low noise amplifier/downconversion unit 6 and 7, respectively. It is to be noted, that the receiver 1 can e.g. be part of a pure receiving device, or can be part of a receiving and transmitting device. In the later case, the antennas 4 and 5 can e.g. be receiving as well as transmitting antennas. The downconverted signals from the units 6 and 7 are respectively forwarded and processed by a Fast Fourier Transformation unit (FFT) 8 and 9, respectively. The transformed signals from the Fourier Transformation units 8 and 9 are forwarded to an equalizing structure 10 according to the present invention and a channel estimator 11. The channel estimator 11 performs, based on the received signal (burst) including training sequences (preamble section), the channel estimation, wherein the channel estimator 11 uses the training sequence to derive the channel estimate. Signals from the channel estimator 11 are supplied to the equalizing structure 10. The equalizing structure 10 performs a maximum likelihood detection in order to determine a candidate signal vector (constellation points) of the signal constellation of the modulation scheme with a minimum Euclidean distance to a received signal vector as a most likely received signal vector. The specific processing is explained further below. After the equalizing processing, the signals are further respectively processed in a demodulator/channel decoder 12 and 13, respectively. The output signals from the demodulator/channel decoders 12 and 13, respectively, are forwarded to a parallel/serial processing unit 14, which outputs the received data bit stream.

The example OFDM transmitter 20 schematically shown in FIG. 1 comprises a radio frequency part 21 and a base band part 22. In the base band part 22, transmit data are split into two parallel data bit streams by a serial/parallel converter 23. The two parallel data bit streams output from the converter 23 are respectively supplied to a channel coder/modulator 24 and 25, respectively. The coded and modulated signals are supplied to an Inverse Fast Fourier Transformation (IFFT) unit 26 and 27, respectively, which supply the transform signals to a respective digital/analogue-converter (DAC) and filter unit 28 and 29, respectively. The analogue filtered signals are then forwarded to a respective upconversion/power amplifying unit 30 and 31, respectively, which transmit the amplified signals via a respective transmit antenna 32 and 33, respectively. It is to be noted, that the transmitter 20 can be part of a transmitting and receiving device and the antennas 32 and 33 can e.g. be receiving as well as transmitting antennas.

As indicated by the dotted line in FIG. 1, the signals transmitted in parallel interfere with each other. For general MIMO systems or any other similar system the received signal column vector for each symbol is given by x having $n_R$ rows, wherein each row of the vector represents the received signal for each of the receiver antennas. The received signal x is given by, $$x = Hs + n \quad (1)$$

where s is the column vector ($n_T \times 1$) of the sent signal, H is the channel matrix ($n_R \times n_T$), representing the channel response from each of the transmitter antennas to the receiving antennas and n is the noise vector ($n_R \times 1$).

For the case of OFDM systems (an example of which is shown in FIG. 1), we shall denote the number of sub-carriers as M. We shall refer to the received baseband signal at sub-carrier m (m=1 ..., M) as the received column vector $x_m$ ($n_R \times 1$). Each row element of the vector is the signal from the FFT output corresponding to the $m^{th}$ sub-carrier for each receiver output at the receiver. The receiver vector $x_m$ can therefore be expressed as, $$x_m = H_m s_m + n_m \quad (2)$$

where $s_m$ is sent signal vector ($n_T \times 1$), $H_m$ is the channel matrix ($n_R \times n_T$), and $n_m$ is the noise vector ($n_R \times 1$). Each row element of the sent signal vector $s_m$ corresponds to the input signal of the IFFT corresponding to the $m^{th}$ sub-carrier for each transmitter. The elements of the channel matrix $H_m$ correspond to the different channel responses from the elements of the transmitted vector to the elements of the received vector. It is therefore the combination of the IFFT, the multi-path channel and the FFT. It accounts for the combined effect of the IFFT, the multi-path channel and the FFT. It is well known, that for OFDM systems that such a combination leads to a channel matrix $H_m$ whose elements $h_{m,ij}$ (i=1 ... $n_R$, j=1 ... $n_T$) are single complex values. For the example shown in FIG. 1 with two transmitting antennas 32, 33 and two receiving antennas 4, 5, the received signal for carrier m can be written as, $$x_m = \begin{bmatrix} x_{m,1} \\ x_{m,2} \end{bmatrix} = \begin{bmatrix} h_{m,11} & h_{m,12} \\ h_{m,21} & h_{m,22} \end{bmatrix} \begin{bmatrix} s_{m,1} \\ s_{m,2} \end{bmatrix} + \begin{bmatrix} n_{m,1} \\ n_{m,2} \end{bmatrix} \quad (3)$$

For each sub-carrier m, the maximum likelihood detector comprised in the equalizer 10 searches over the whole set of possible transmit signals $s_m \in A$ (where A is the set of all possible transmit vectors) to decide in favor of the transmit signal vector $\hat{s}_m$ which has the minimum Euclidean distance to the receive vector $x_m$, $$\hat{s}_m = \arg \min_{s_m \in A} \|x_m - H_m s_m\|^2 \quad (4)$$

The size of the possible transmit signal set A, containing all of the possible sent signal vectors depends upon the number of possible sent symbols from each antenna (which depends on the modulation constellation size) and the number of transmit antennas The number of possible sent signals vectors is given by, $$\text{NSV} = \text{Number of possible sent signal vectors} = (\text{Modulation Constellation Size})^{n_T} \quad (5)$$

Therefore for higher-level modulation schemes with more than two antennas, the set size can be extremely large and the number of comparison needed to be performed for each sub-carrier in equation (4) is given by $$\text{Number of comparisons} = \text{NSV} - 1 = (\text{Modulation Constellation Size})^{n_T} - 1 \quad (6)$$

To summarize, table 1 shows the number of comparisons that have to be made in equation (4) for each sub-carrier for the commonly used modulation schemes BPSK, QPSK, 16 QAM and 64 QAM.

TABLE 1

Number of comparisons for each sub-carrier for the MLD algorithm

| Modulation Scheme | Antennas ($n_T$, $n_R$) | | |
|---|---|---|---|
| | 2, 2 | 3, 3 | 4, 4 |
| BPSK | 3 | 7 | 15 |
| QPSK | 15 | 63 | 255 |
| 16QAM | 255 | 4095 | 65535 |
| 64QAM | 4095 | 262143 | $1.7 \times 10^7$ |

The number of comparisons is of course only one measure of complexity. Other measures include the number of multiplications, additions and subtractions. The exact number of multiplications depends on the implementation. However, for a maximum likelihood detector implementation in communication systems, in which a preamble is thinned followed by a data part, once the channel matrix H is known, e.g. via channel estimation during the preamble period, the complete set of vector products Hs can be formed. This means that during the reception of the data part or data section, only the comparisons need to be computed, which is visualized in FIG. 2 which visualizes the processing steps for a maximum likelihood detection. During the reception of the preamble section, the multiplications and additions for Hs is calculated, so that during the reception of the data section, only the subtractions and comparisons of $\|r - Hs\|^2$ for every data symbol needs to be calculated.

If we assume that the matrix H and the vector s have only real values (the may have real values or complex values), the number of multiplications needed to generate Hs is given by $$\text{Multiplications} = n_R \times n_T \times (\text{modulation constellation size})^{n_T} \quad (7)$$

or if the matrix H and vector s have complex values, the number of multiplications needed to generate Hs is given by $$\text{Multiplications} = 4 \times n_R \times n_T \times (\text{modulation constellation size})^{n_T} \quad (8)$$

List Maximum Likelihood Detection:

The above described maximum likelihood detection algorithm becomes very complex for higher level modulation schemes. In the following, an alternative embodiment of an equalizing method or equalizing structure is described which approximates a maximum likelihood detector solution, but has a much reduced complexity and is therefore well suited for higher level modulation schemes, thus enabling an optimal implementation in a receiving device. An example for an implementation of such an improved maximum likelihood detection algorithm is shown in FIG. 3. The equalizer 10 shown in and explained in relation to FIG. 1 in this example comprises a selector 14 adapted to select one of the two (or more) transmit signals, an estimator 15 adapted to calculate, for at least some candidate constellation values for the selected transmit signal, an estimate constellation value for the non-selected one(s) of the transmit signal(s) by interference cancellation calculation, a maximum likelihood detector 16 comprising a metric value calculator 17 adapted to calculated metric values on the basis of receive signal vectors and the product of channel estimation values with candidate signal vectors, whereby the maximum likelihood detector is adapted to detect one of the candidate signal vectors having a minimum Euclidian distance to a respective receive signal vector as the most likely transmit signal vector on the basis of the metric values, and a soft decision value calculator 18 adapted to calculate a soft decision value for the most likely candidate signal vectors on the basis of the candidate signal vectors of at least some of the metric values. The equalizer 10 further may comprise optionally a processor 19 adapted to calculate an estimate for a constellation value of a received signal and to determine a number of candidate constellation values in the vicinity of said estimated constellation value in the signal constellation, so that the number of constellations performed in the maximum likelihood detector 16 can be reduced. The functionalities of the selector 14, the estimator 15, the detector 16, the metric value calculator 17, the soft value calculator 18 and the processor 19 are explained in greater detail below. It has to be noted that these elements and units can be implemented either as software or hardware units or as a mixture thereof in the suitable manner for the respective wanted functionality.

In the following, the above-mentioned alternative embodiment to the above-described maximum likelihood detection is described, which is also called a List Maximum Likelihood Detection and which is embodied in the selector 14, the estimator 15 and the maximum likelihood detector 16 with the metric value calculator 17.

It is to be noted that the equalizer 10 does not necessarily have to comprise all of the elements and units shown in FIG. 3 but may have only a reduced selection thereof as will be explained further below.

The first step of this list maximum likelihood detection (list MLD) algorithm is to set up a candidate list for the first data stream to be detected. Hereby, the term "data stream" refers to the signals transmitted from one of the transmitting antennas. In this sense, the candidate list is a list of probable sent constellation points or candidate signal vectors which could have been sent from one of the transmit antennas. The selector 14 hereby selects one of the first or second data stream (one of the two or more transmit signals) on the basis of a correspondingly chosen criteria, as e.g. the data stream of the worst transmission quality, such as the lowest received signal to noise ratio, on the basis of corresponding channel estimation information received from the channel estimator 11. The estimator 15 is then adapted to set up the candidate list, i.e. the candidate constellation values for the selected data stream, and to calculate estimates for the non-selected data stream(s) on the basis of an interference calculation.

If e.g. a 16 QAM modulation scheme is schematically shown in FIG. 4, is used for the transmission of information or data, the candidate list would therefore contain each of the 16 possible constellation values (candidate constellation values) and have a list length L=modulation constellation size=16, whereby each constellation point is represented as a complex number indicating its position on the in phase and quadrature plane. Correspondingly, when a 64 QAM modulation scheme, as schematically shown in FIG. 5, is used for the transmission, the candidate list would contain each of the 64 possible constellation values (a constellation value is a bit-map which is allocated to each of the constellation points of the constellation scheme) and would have a list length L=64.

By considering each of the constellation values in the list, in turn, the constellation values for the other data streams (transmitters) are generated using interference cancellation (IC). Therefore for every point i, (i=1, ..., L) in the list for one transmitter, we have a complete sent vector $s_i$ (candidate signal vector).

$$s_i = \begin{pmatrix} s_{1,i} \\ \vdots \\ \vdots \\ s_{Tx,i} \end{pmatrix} \quad (8)$$

containing one value from the list for one transmitter(s) and the other values for the other transmitter which have been obtained from IC. The L different $s_i$ vectors are then tested in equation (4) to find the one which has the lowest metric and therefore corresponds to the most likely sent symbol vector.

To obtain optimum performance with this list MLD algorithm, it is important that one of the transmitter signals, advantageously the one with the lowest received signal to noise ratio (SNR) is assigned to be the first stream and therefore the transmitter signals with the highest received signal to noise ratios (SNR) are obtained by interference cancellation. This is important, because the interference cancellation step is sensitive to the effects of noise.

A simple way to make this decision for our 2 transmitter example is as follows:

If $$\left\| \begin{matrix} h_{11} \\ h_{21} \end{matrix} \right\|^2 > \left\| \begin{matrix} h_{12} \\ h_{22} \end{matrix} \right\|^2$$

(which are estimates for the SNRs), generate values of transmitter 2 from the list and derive estimates of transmitter 1 using IC, else, generate values of transmitter 1 from the list and derived estimate of transmitter 2 using IC.

To explain the equalizer 10 in more detail, we shall use as an example a 2 transmitter system, in which the $2^{nd}$ transmitter has a higher received SNR and therefore the first transmitter values are selected by the selector 14 and the estimator 15 establishes the list of candidate constellation for the first transmitter values and calculates estimates for the respective second transmitter values.

For each constellation point $s_{1,i}$ (i=1, ..., L) for stream 1 from the list, the estimated signal $\hat{s}_{2,i}$ for stream 2 is obtained in the estimator 15 as follows, $$x_{c,i} = x - s_{1,i} \begin{pmatrix} h_{11} \\ h_{21} \end{pmatrix} \quad (9)$$

Where x is the receive signal vector ($n_R \times 1$) (see equation 3) and $x_{c,i}$ is the receive signal vector after cancellation. Then, the minimum mean squared error of $x_{c,i}$ is calculated as $x_{mmse,i}$ is $$x_{mmse,i} = \begin{pmatrix} x_{c,i} \\ 0 \\ 0 \end{pmatrix} \quad (10)$$

Afterwards, the estimate $s_{2,i}$ of the second stream (stream 2) is obtained by:

$$\tilde{s}_{2,i} = \begin{pmatrix} h_{21} \\ h_{22} \\ 1/SNR \\ 0 \end{pmatrix}^+ x_{mmse,i} \quad (11)$$

where SNR is the signal to noise ratio, e.g. the average signal to noise ratio, and $(.)^+$ is the Moore Penrose pseudo inverse (PINV) function. It has to be understood that the use of the Moore Penrose pseudo inverse function is only an example and that other suitable pseudo inverse functions can be used.

The soft output signal $\tilde{s}_2$ is finally quantized in the estimator 15 to obtain the final hard decision estimate $\hat{s}_2$.

$$\hat{s}_{2,i} = Q(\tilde{s}_{2,i}) \quad (12)$$

Where Q(.) represents the quantizing function corresponding to the chosen modulation scheme.

The two values $s_{1,i}$ and $\hat{s}_{2,i}$ (which form a candidate signal) are then supplied to the maximum likelihood detector 16, used in the MLD equation and the metric $m_i$ value is calculated in the metric value calculator 17:

$$m_i = \|x - Hs\|^2 = \left\| \begin{pmatrix} x_1 \\ x_2 \end{pmatrix} - \begin{pmatrix} h_{11} & h_{12} \\ h_{21} & h_{22} \end{pmatrix} \begin{pmatrix} s_{1,i} \\ \hat{s}_{2,i} \end{pmatrix} \right\|^2 \quad (13)$$

This process (equations 9-13) is repeated for all candidate constellation values $s_{1,i}$ (i=1, ..., L). For the 16 QAM scheme with a full list size, since there are 16 candidates the process is repeated 16 times and 16 values of $m_i$ (i=1, ..., L). are produced. Similarly for the 64QAM scheme with a full list size the process is repeated 64 times and 64 values of $m_i$ (i=1, ..., L) are produced.

For each repetition of the list MLD only the lowest value of the $m_i$ is retained in the maximum likelihood detector 16. The lowest value corresponds to the constellation values $\hat{s}_{2,i}$ and $s_{1,i}$ which are most likely to have been sent and is therefore the hard output of the detector 16. This algorithm has a complexity advantage compared to the first described MLD algorithm because equation 13 only needs to be performed a number of times, corresponding to the list size L. For a full list, L=modulation constellation size. The first described MLD on the other hand, has to perform equation 4 a number of times corresponding to (Modulation Constellation Size)$^m$.

In the following, additional advantageous implementation possibilities for the equalizing structure and equalizing method of the present invention are described, which improve performance, reduce complexity and ease implementation.

Soft Decision Value Calculation

The above-described List MLD algorithm (equations 9-13) embodied in the selector 14, the estimator 15 and the detector 16 produces a hard decision related to which constellation values are most likely to have been sent The List MLD algorithm therefore outputs hard decision on the bits associated with these constellation values. (Example associated bit patterns can be seen next to the constellation points on the example 16 QAM and 64 QAM constellations shown in FIG. 4 and FIG. 5).

For many communication systems (especially one using 'soft' decision channel decoding) a large performance improvement can be obtained if the equalizer produces bits with soft information indicating how confident the equalizer is about their sign. Therefore we propose here a method and a structure to produce soft bits, namely the soft decision value calculator 18.

To produce the soft bits for the List MLD equalizer, instead of retaining only the lowest $m_i$ when each constellation value $s_{1,i}$ (i=1, ..., L) for stream 1 is processed using equations 9-13, all of the metrics $m_i$ (i=1, ..., L) as they are computed from the metric value calculator 17 are stored into a table. Additionally for each i the associated bit pattern associated with $\hat{s}_{2,i}$ and $s_{1,i}$ is stored. The metrics and their associated bit patterns are then sorted in the calculator 18 on a row basis with respect to the ascending values of metrics, such that the lowest metric is at the bottom of the table.

An example table which has been sorted for a full list for 16 QAM (L=16) is shown in FIG. 6. To compute the soft information for each bit, the bit pattern associated with the lowest metric (placed at the bottom of the table) is compared in the calculator 18 with bit patterns at successive rows in the list. When there is a change in the bit (from 1 to 0, or 0 to 1), the difference in the metric between the lowest metric and the next lowest metric where the bit change first occurred, is taken to be the soft information for that bit. Two examples of the computation are shown in FIG. 6.

If at the highest row of the list, no change in a given bit has been found, the soft output for that bit is set to a predetermined value related to the size of the list L, indicating high confidence.

Other implementation variations can also be used, but the general principal of using the lowest difference in metric between the lowest metric and the next lowest metric where a bit is changed is proposed here. It is to be understood that the described soft decision value calculation performed in the calculator 18, can also be combined with the first described maximum likelihood detection instead of the list MLD.

In general words, the soft decision value calculator 18 is adapted to calculate a soft decision value for the most likely candidate signal vectors on the basis of the candidate signal vectors of at least some of the metric values. Advantageously, the soft decision value calculator is adapted to calculate the soft decision value on the basis of differences between the candidate signal vectors of at least some of the metric values. Further advantageously, the maximum likelihood detector 16 is adapted to detect the most likely candidate signal vector by selecting the lowest metric value, wherein said soft decision value calculator 18 is adapted to calculate a soft decision value for the most likely candidate signal vector on the basis of the difference between the most likely candidate signal vector of the lowest metric value and the candidate signal vectors of the other metric values. Hereby, the soft decision value calculator 18 is advantageously adapted to calculate said soft decision values depending on a difference between the candidate signal vector of the lowest metric value and the next lowest metric value, in which a change in the corresponding candidate signal vector in relation to the candidate signal vector of the lowest metric value occurs. Hereby, the soft decision value calculator 18 is advantageously adapted to calculate said soft decision value proportional to the difference between the lowest metric value and the next lowest metric value in which a change in the corresponding candidate signal vector in relation to the candidate signal vector of the lowest metric value occurs. Hereby, the soft decision value calculator decision value calculator 18 is advantageously adapted to calculate said soft decision value as the difference between the lowest metric value and the next lowest metric value in which a change in the candidate signal vector of the lowest metric value occurs. Advantageously, the candidate signal vectors consist of bit patterns, wherein the soft decision value calculator is adapted to calculate a soft decision value for each bit of the bet pattern of the most likely candidate signal vector.

Complexity Reduction of Euclidean Distance Calculation

Equation (13), which is the so called MLD equation which is calculated in the detector 16 computes the Euclidian distance between the received signal x and a possible transmit signal vector s multiplied by the channel matrix H. It requires the computation of the norm operation $\|(.)\|^2$. If we assume the variable represent complex signals in equation (13), equation (13) can be expanded as follows:

$$\left\|\begin{pmatrix} x_1 \\ x_2 \end{pmatrix} - \begin{pmatrix} h_{11} & h_{12} \\ h_{21} & h_{22} \end{pmatrix}\begin{pmatrix} s_{1,i} \\ \hat{s}_{2,i} \end{pmatrix}\right\|^2 = \left\|\begin{pmatrix} x_1 \\ x_2 \end{pmatrix} - \begin{pmatrix} HS_{1,i} \\ HS_{2,i} \end{pmatrix}\right\|^2 = \quad (14)$$

$$(x_{1(real)} - HS_{1,i,(real)})^2 + (x_{1(imag)} - HS_{1,i,(imag)})^2 +$$
$$(x_{2(real)} - HS_{2,i,(real)})^2 + (x_{2(imag)} - HS_{2,i,(imag)})^2$$

Here the sub-scripts (real) and (imag) represent the I (In phase) and Q (quadrature phase) components of the complex signals. As can be seen in (14), this computation involves 4 square functions $(.)^2$. These square functions require the relevant terms to be multiplied. Since equation (14) has to be performed many times and because multiplications are expensive operations to implement in hardware, the metric calculator 17 and the detector 18 can be modified and adapted to calculate (14) using the following approximation:

$$\left\|\begin{pmatrix} x_1 \\ x_2 \end{pmatrix} - \begin{pmatrix} h_{11} & h_{12} \\ h_{21} & h_{22} \end{pmatrix}\begin{pmatrix} s_{1,i} \\ \hat{s}_{2,i} \end{pmatrix}\right\|^2 = \left\|\begin{pmatrix} x_1 \\ x_2 \end{pmatrix} - \begin{pmatrix} HS_{1,i} \\ HS_{2,i} \end{pmatrix}\right\|^2 \approx \quad (15)$$

$$\text{abs}(x_{1(real)} - HS_{1,i,(real)}) + \text{abs}(x_{1(imag)} - HS_{1,i,(imag)}) +$$
$$\text{abs}(x_{2(real)} - HS_{2,i,(real)}) + \text{abs}(x_{2(imag)} - HS_{2,i,(imag)})$$

Where the abs (.) function is the absolute value function. The absolute value function can be easily implemented e.g. in hardware since it requires only the bit indicating the sign information (sign-bit) to be removed.

In general words, the metric value calculator 17 is adapted to calculate metric values on the basis of said receive signal vectors and the product of channel estimation values with candidate signal vectors using absolute value calculations. Advantageously, the metric value calculator 17 is hereby adapted to calculate each of said metric values on the basis of absolute value calculations of a difference between the receive signal vectors and the product of the channel estimation values with candidate signal vectors. Hereby, the metric value calculator 17 is advantageously adapted to calculate each of the metric values on the basis of absolute value calculations of each difference between a receive signal for each receive data stream and the product of the channel estimation values with a respective candidate constellation value for the data stream. Hereby, the metric value calculator 17 is advantageously adapted to calculate each of the metric values on the basis of a sum of absolute values calculated for each of the differences.

It is to be noted that the just described modified metric calculator 17 and detector 16 can be combined with the list MLD algorithm, i.e. with the selector 14 and estimator 15, or with the first described maximum likelihood detection. Also the modified metric calculator 17 and detector 16 can be combined with the soft decision value calculator 18 or not.

MMSE/ZF Pre-processing Step

Up till now, calculation and use of a full list of candidate constellation values has been described for the list MLD, that is a list in which L=modulation constellation site. Since the main processing for the List MLD as performed in the estimator 15 and the detector 16 involves processing equations (9)-(13) L times, a considerable reduction in complexity can be obtained if the list size L is reduced. It is therefore proposed to use a pre-processing structure, namely a processor 19, which provides information as to where the most likely sent symbol vector is likely to be.

In the processor 19 either an MMSE (minimum mean square error) or a ZF (zero forcing) algorithm is implemented. To illustrate the algorithm again the 2 transmitter example is used:

For the case of the MMSE algorithm, the processor is adapted to perform the following steps.

Step 1: Derive the MMSE Solution, i.e. an Estimate for a Received Signal Vector on the Basis of the Channel Estimation Values, a Signal-to-noise Ratio and a Received Signal Vector:

$$\begin{pmatrix} \tilde{s}_1 \\ \tilde{s}_2 \end{pmatrix} = \begin{pmatrix} h_{11} & h_{12} \\ h_{21} & h_{22} \\ 1/SNR & 0 \\ 0 & 1/SNR \end{pmatrix}^+ \begin{pmatrix} x_1 \\ x_2 \\ 0 \\ 0 \end{pmatrix} \quad (16)$$

Where $(.)^+$ is the Moore Penrose pseudo inverse (PINV) function (other pseudo inverse function could be used) and SNR is the estimated signal to noise ratio. The values $\tilde{s}_2$ and $\tilde{s}_1$ represent soft values.

Step 2: Quantize the MMSE Solution

The soft values $\tilde{s}_2$ and $\tilde{s}_1$ are then quantized, to fit $$\hat{s}_1 = Q(\tilde{s}_1) \quad (17)$$

$$\hat{s}_2 = Q(\tilde{s}_2) \quad (18)$$

Where Q(.) represents the quantize function for the modulation scheme and make a hard decision as to which constellation values are likely to have been sent.

Step 3: Form the Reduced Size List (L<Modulation Constellation Size)

Depending upon which transmitter has been identified to have the highest signal power in the processor 19, $\hat{s}_1$ or $\hat{s}_2$ is chosen to be at the centre (or offset or close to the centre) of a region or area containing points which are to be contained in the list. FIG. 7 through to FIG. 10 show example regions which correspond to list sizes of L=16, 25, 32 and 36 points respectively. Shown on the Figures, is the MMSE solution marked by a cross, the quantized MMSE solution marked as a shaded constellation point and surrounding points which will be contained in the list. The exact size and shape of the regions is implementation specific and the figures only illustrate possible examples. The larger the region and the (number of subsequent point inside the region), the better the performance but the higher the complexity.

For the zero forcing solution the first step is replaced by a "derive ZF solution step", in which to estimate for the receive signal vector for the 2 transmitter example can calculated only on the basis of the channel estimation values and the received signal vector:

$$\begin{pmatrix} \tilde{s}_1 \\ \tilde{s}_2 \end{pmatrix} = \begin{pmatrix} h_{11} & h_{12} \\ h_{21} & h_{21} \end{pmatrix}^{+} \begin{pmatrix} x_1 \\ x_2 \end{pmatrix} \quad (19)$$

Generally, the processor 19 is adapted to calculate an estimate for a constellation value of a received signal and to determine a number of candidate constellation values in the vicinity of the estimated constellation value in the signal constellation. Hereby, the processor 19 is advantageously adapted to calculate the estimate for the constellation value on the basis of channel estimation values and the received signal. Further advantageously, the processor 19 is adapted to calculate the estimate for the constellation value on the basis of a product of a matrix of the channel estimation values with the received signal vector. Further, the processor 19 is advantageously adapted to calculate the estimate for the constellation value on the basis of a product of a pseudo inverse matrix of the channel estimation value with the received signal vector. Alternatively, the processor 19 is adapted to calculate the estimate for said constellation value on the basis of channel estimation values, a signal-to-noise value estimate and the received signal. Hereby, the processor 19 is advantageously adapted to calculate the estimate for the constellation value on the basis of a product of a matrix comprising the channel estimation values and inverse values of the signal-to-noise value estimate with the received signal. The processor 19 is further advantageously adapted to calculate the estimate for the constellation value on the basis of a product of pseudo inverse matrix comprising said channel estimation values and inverse values of the signal-to-noise value estimate with the received signal.

The processor 19, after calculating the constellation value estimate for each data value of a received signal vector, i.e. calculating a constellation value estimate for each data value for each receive data stream of a received signal vector, is advantageously adapted to choose one of said constellation value estimates depending on the transmission quality and to determine the number of candidate constellation values in the vicinity of the chosen estimate constellation value in said signal constellation. Further, the processor 19 is advantageously adapted to determine a number of candidate constellation values in the vicinity of said estimated constellation value in the signal constellation by selecting the number of candidate constellation values as a subset of all available constellation values in the signal constellation around said one estimated constellation value.

It is to be understood that the implementation of the processor 19 in the equalizer 10 can be combined with the implementation of the soft decision value calculator 18, and/or the implementation of the modified detector 16 and metric value calculator 17.

Novel Feature 4: Pseudo Inverse Calculation and Partial Hs Pre-calculation

As described previously the standard List MLD algorithm performs equations 9-13 for each $s_{1,i}$ (i=1, ..., L) in the list. Equations (9)-(13) are therefore computed L times in the selector 14, the estimator 15 and the detector 16.

It is proposed to reduce complexity for systems in which there is a preamble part followed by data slots (see FIG. 2) and/or for systems in which the channel changes very slowly, by calculating the required pseudo inverse indicated by the $(.)^{+}$ operation in equation (11) performed in the metric value calculator 17 only when new channel information is available from the channel estimator 11. For a system with a frame structure as shown in FIG. 2. This means that only the pseudo inverse in equation 11 is calculated during or at the end of the preamble phase or the beginning of the data phase in the calculator 17.

This means that the pseudo inverse is only calculated once as compared to L times for every symbol for that state or the art equalizer. The complexity is therefore reduced.

Furthermore for systems, for which there is a preamble part followed by data slots (see FIG. 2) and/or for systems in which the channel changes very slowly, some of the processing needed for Equation (13) (or Equation (15), if implemented) during a data slot can also be re-distributed to a preamble slot. This can be seen by expanding and factorizing equation (13) as follows:

$$m_i = \|x - Hs\|^2 \quad (20)$$

$$= \left\| \begin{pmatrix} x_1 \\ x_2 \end{pmatrix} - \begin{pmatrix} h_{11} & h_{12} \\ h_{21} & h_{22} \end{pmatrix} \begin{pmatrix} s_{1,i} \\ \hat{s}_{2,i} \end{pmatrix} \right\|^2 = \left\| \begin{pmatrix} x_1 \\ x_2 \end{pmatrix} - \begin{pmatrix} h_{11} s_{1,i} + h_{12} \hat{s}_{2,i} \\ h_{21} s_{1,i} + h_{21} \hat{s}_{2,i} \end{pmatrix} \right\|^2$$

$$= \left\| \begin{pmatrix} x_1 \\ x_2 \end{pmatrix} - \begin{pmatrix} A_i + h_{12} \hat{s}_{2,i} \\ B_i + h_{21} \hat{s}_{2,i} \end{pmatrix} \right\|$$

Since the channel elements $h_{ij}$ (i=1, ..., $n_R$, j=1, ..., $n_T$) do not change (and only need to be newly calculated if new channel estimation values are obtained) and because the complete set of $s_{1,i}$ (i=1, ... L), i.e. the candidate constellation values for a selected transmit signal, are known. The partial product term represented by $A_i$ and $B_i$ can be calculated for all i during or at the end of the preamble phase or at the beginning of the data phase. This is shown pictorially in FIG. 11.

This means that $A_i$ and $B_i$ only need to be calculated in the calculator 17 for every i value once during the preamble and do not need to be recalculated for every new symbol.

Generally, the selector 14 is adapted to select one of the two or more transmit signals (or data streams). Further, the estimator 15 is adapted to calculate, for at least some candidate constellation values for the selected transmit signals, an estimate constellation value for the non-selected one(s) of the transmit signal(s) by interference cancellation calculation in order to obtain candidate signal vectors for each of said at least some candidate constellation values, each candidate signal vector comprising one of said at least some candidate constellation values for the selected transmit signal and the estimate constellation value for the corresponding non-selected one(s) of said transmit signal(s), wherein channel estimation values used in the interference cancellation calculation and/or in the maximum likelihood detection (cf. equation (13) and/or (15)) are only updated in case that new channel estimation values are obtained. Advantageously, in said interference cancellation calculation a product between a cancellation signal vector and the channel estimate vector comprising said channel estimation values for the non-selected one(s) of said transmit signal(s) is calculated. Hereby, the channel estimate vector is only updated in case that new channel estimation values for the non-selected one(s) of said transmit signal(s) are obtained. Further, the cancellation signal vector is advantageously calculated on the basis of a difference between the receive signal vector and the respective candidate constellation value multiplied with channel estimate values for the selected transmit signal, whereby the channel estimate values for the selected transmit signal are only updated when new channel estimate values are obtained. Hereby, the maximum likelihood detector 16 may be adapted to detect said most likely transmit signal vector (implementation of equation (13) and/or 15)) on the basis of a product of channel estimation values with a candidate signal vector wherein channel estimation values multiplied with candidate constellation values for said selected transmit signal are only updated when new channel estimation values are obtained.

The invention claimed is:

1. An equalizing structure for a receiving device of a wireless communication system, in which two or more transmit signals transmitted in parallel from one or more transmitters are received in received signal vectors representing two or more received data streams, the signals including information modulated onto carrier signals according to a modulation scheme, wherein all possible transmit signals are represented by candidate constellation values in the signal constellation of the modulation scheme, the structure comprising:
a selector adapted to select one of the two or more transmit signals;
an estimator adapted to calculate, for at least some candidate constellation values for the selected transmit signal, an estimate constellation value for the non-elected one(s) of the transmit signal(s) by interference cancellation calculation to obtain candidate signal vectors for each of the at least some candidate constellation values, each candidate signal vector comprising one of the at least some candidate constellation values for the selected transmit signal and the estimate constellation value for the corresponding non-selected one(s) of the transmit signal(s); and
a maximum likelihood detector adapted to detect one of the candidate signal vectors having a minimum Euclidean distance to a respective receive signal vector as a most likely transmit signal vector,
wherein channel estimation values used in the interference cancellation calculation and/or the maximum likelihood detection are only updated in case new channel estimation values are obtained.

2. An equalizing structure according to claim 1, wherein in the interference cancellation calculation a product between a cancellation signal vector and a channel estimate vector comprising the channel estimation values for the non-selected one(s) of the transmit signal(s) is calculated.

3. An equalizing structure according to claim 1, wherein the channel estimate vector is only updated in case that new channel estimation values for the non-selected one(s) of the transmit signal(s) are obtained.

4. An equalizing structure according to claim 2, wherein the cancellation signal vector is calculated on the basis of a difference between the received signal vector and the respective candidate constellation value multiplied with channel estimate values for the selected transmit signal, wherein the channel estimate values for the selected transmit signal are only updated when new channel estimate values are obtained.

5. An equalizing structure according to claim 1, wherein the maximum likelihood detector is adapted to detect the most likely transmit signal vector based on a product of channel estimation values with a candidate signal vector, wherein channel estimation values multiplied with candidate constellation values for the selected transmit signal are only updated when new channel estimation values are obtained.

6. An equalizing method for a wireless communication system, in which two or more transmit signals transmitted in parallel from one or more transmitters are received in received signal vectors representing two or more received data streams, the signals comprising information modulated onto carrier signals according to a modulation scheme, wherein all possible transmit signals are represented by candidate constellation values in the signal constellation of the modulation scheme, the method comprising:
selecting one of the two or more transmit signals;
calculating, for at least some candidate constellation values for the selected transmit signal, an estimate constellation value for the non-selected one(s) of the transmit signal(s) by interference cancellation calculation to obtain candidate signal vectors for each of the at least some candidate constellation values, each candidate signal vector comprising one of the at least some candidate constellation values for the selected transmit signal and the estimate constellation value for the corresponding non-selected one(s) of the transmit signal(s), wherein channel estimation values used in the interference cancellation calculation are only updated in case that new channel estimation values are obtained; and
detecting one of the candidate signal vectors having a minimum Euclidean distance to a respective receive signal vector as a most likely transmit signal vector.

7. An equalizing method according to claim 6, wherein in the interference cancellation calculation a product between a cancellation signal vector and a channel estimate vector comprising the channel estimation values for the non-selected one(s) of the transmit signal(s) is calculated.

8. An equalizing method according to claim 7, wherein the channel estimate vector is only updated in case that new channel estimation values for the non-selected one(s) of the transmit signal(s) are obtained.

9. An equalizing method according to claim 7, wherein the cancellation signal vector is calculated based on a difference between the received signal vector and the respective candidate constellation value multiplied with channel estimate values for the selected transmit signal, wherein the channel estimate values for the selected transmit signal are only updated when new channel estimate values are obtained.

10. An equalizing method according to claim 6, wherein the most likely transmit signal vector is detected based on a product of channel estimation values with a candidate signal vector, wherein channel estimation values multiplied with candidate constellation values for the selected transmit signal are only updated when new channel estimation values are obtained.

11. A non-transitory computer readable medium including computer executable instructions for controlling a receiving device for receiving information signals in a wireless communication system that when run on the receiving device, cause the receiving device to perform the method of claim 6.

* * * * *